(12) United States Patent
Weber et al.

(10) Patent No.: US 7,791,687 B2
(45) Date of Patent: Sep. 7, 2010

(54) DISPLAY INCLUDING REFLECTIVE POLARIZER

(75) Inventors: Michael F. Weber, Shoreview, MN (US); Timothy J. Nevitt, Red Wing, MN (US); Roger J. Strharsky, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 781 days.

(21) Appl. No.: 11/614,409

(22) Filed: Dec. 21, 2006

(65) Prior Publication Data

US 2008/0151147 A1 Jun. 26, 2008

(51) Int. Cl.
*G02F 1/1335* (2006.01)
(52) U.S. Cl. ........................................ 349/96; 359/487
(58) Field of Classification Search ................... 349/96, 349/98, 115; 359/487
See application file for complete search history.

(56) References Cited

U.S. PATENT DOCUMENTS

| | | | | |
|---|---|---|---|---|
| 4,320,936 A | * | 3/1982 | Sawamura | .................. 359/359 |
| 4,659,523 A | | 4/1987 | Rogers et al. | |
| 4,756,953 A | | 7/1988 | Utsumi | |
| 4,895,769 A | | 1/1990 | Land et al. | |
| 5,103,337 A | * | 4/1992 | Schrenk et al. | ............. 359/359 |
| 5,808,794 A | | 9/1998 | Weber et al. | |
| 5,882,774 A | | 3/1999 | Jonza et al. | |
| 6,096,375 A | | 8/2000 | Ouderkirk et al. | |
| 6,124,971 A | | 9/2000 | Ouderkirk et al. | |
| 6,179,948 B1 | | 1/2001 | Merrill et al. | |
| 6,449,439 B1 | | 9/2002 | Boyd et al. | |
| 6,498,683 B2 | | 12/2002 | Condo et al. | |
| 6,697,195 B2 | | 2/2004 | Weber et al. | |
| 6,774,961 B2 | * | 8/2004 | Faris et al. | .................... 349/98 |
| 6,859,245 B2 | * | 2/2005 | Faris et al. | .................. 349/115 |
| 2002/0186474 A1 | | 12/2002 | Weber et al. | |
| 2003/0193636 A1 | | 10/2003 | Allen et al. | |
| 2004/0099992 A1 | | 5/2004 | Merrill et al. | |
| 2004/0114248 A1 | | 6/2004 | Hokazono et al. | |
| 2004/0227994 A1 | | 11/2004 | Ma et al. | |
| 2005/0200771 A1 | | 9/2005 | Lazarev et al. | |

FOREIGN PATENT DOCUMENTS

| | | |
|---|---|---|
| JP | 11-160533 | 6/1999 |
| WO | WO 95/17691 | 6/1995 |

OTHER PUBLICATIONS

Lazarev et al., Low-leakage off-angle in E-polarizers, Journal of the SID 9/2, pp. 101-105 (2001).
Denker et al., "Advanced Polarzier Film for Improved Performance of Liquid Crystal Displays," presented at Society for Information Displays (SID) International Conference in San Francisco, CA, Jun. 4-9, 2006.

* cited by examiner

*Primary Examiner*—James A Dudek
(74) *Attorney, Agent, or Firm*—Jay R. Pralle (57) ABSTRACT

A display device includes a display panel and a biaxial reflective polarizer having a plurality of layers characterized by a varying optical thickness. A majority of the layers of the biaxial reflective polarizer having a smaller optical thickness are disposed closer to the display panel than the layers having a larger optical thickness.

20 Claims, 8 Drawing Sheets

DISPLAY INCLUDING REFLECTIVE POLARIZER

FIELD OF THE INVENTION

The present disclosure is directed to displays including reflective polarizers.

BACKGROUND

Display devices, such as liquid crystal display (LCD) devices, are used in a variety of applications including, for example, televisions, hand-held devices, digital still cameras, video cameras, and computer monitors. Because an LCD panel is not self-illuminating, some display applications may require a backlighting assembly or a "backlight." A backlight typically couples light from one or more sources (e.g., a cold cathode fluorescent tube (CCFT) or light emitting diodes (LEDs)) to the LCD panel.

Common display devices usually include polarizers. The most commonly used type of a polarizer is a dichroic polarizer. Dichroic polarizers are made, for example, by incorporating a dye into a polymer sheet that is then stretched in one direction. Dichroic polarizers can also be made by uniaxially stretching a semicrystalline polymer such as polyvinyl alcohol, then staining the polymer with an iodine complex or dichroic dye, or by coating a polymer with an oriented dichroic dye. These polarizers often have an extinction ratio (the ratio of transmission of light polarized perpendicular to the stretch direction to the transmission of light polarized parallel to the stretch direction) of 1000:1 or more. Dichroic polarizers normally have a substantial amount of absorption of light polarized along the high transmission direction. Many commercial polarizers typically use polyvinyl alcohol as the polymer matrix for the dye, however, other polymers can be used. For example, U.S. Pat. No. 4,756,953 describes the use of polyethylene naphthalate as the polymer matrix.

Another common type of a polarizer used in displays is a reflective polarizer. Reflective polarizers tend to be more efficient in transmitting light of the high transmission polarization. This is due to the use of a non-absorbing dielectric stack for polarizing light. These types of polarizers sometimes have defects, such as leakage of light through localized areas of the sheet and incomplete reflectivity of the high extinction polarization over the wavelength region of interest.

In some displays applications, reflective and dichroic polarizers have been combined, as described, for example, in Ouderkirk et. al., U.S. Pat. No. 6,096,375. The combination of the two polarizers provides a high reflectivity of one polarization and high transmission for the perpendicular polarization for light incident on the reflective polarizer side of the combined polarizer, and high absorption and transmission for light of orthogonal polarizations incident on the dichroic polarizer side.

SUMMARY

In one implementation, a display device of the present disclosure includes a display panel and a biaxial reflective polarizer having a plurality of layers characterized by a varying optical thickness. A majority of the layers of the biaxial reflective polarizer are disposed such that their optical thicknesses decrease monotonically in the direction toward the display panel.

In another implementation, a display device of the present disclosure includes a display panel, a biaxial reflective polarizer having a plurality of layers characterized by a varying optical thickness and an absorbing polarizer disposed next to a viewer side of the biaxial reflective polarizer. The absorbing polarizer has a contrast ratio of about 500:1 or less. A majority of the layers of the biaxial reflective polarizer having a smaller optical thickness are disposed closer to the display panel than the layers having a larger optical thickness.

In yet another implementation, a display device of the present disclosure includes a display panel, a biaxial reflective polarizer having a plurality of layers characterized by a varying optical thickness and an absorbing polarizer disposed next to a viewer side of the biaxial reflective polarizer. The absorbing polarizer has a contrast ratio of less than 1000:1. A majority of the layers of the biaxial reflective polarizer are disposed such that their optical thicknesses decrease monotonically in the direction toward the display panel.

These and other aspects of the display devices of the subject invention will become more readily apparent to those having ordinary skill in the art from the following detailed description together with the drawings.

BRIEF DESCRIPTION OF THE DRAWINGS

So that those having ordinary skill in the art to which the subject invention pertains will more readily understand how to make and use the subject invention, exemplary embodiments thereof will be described in detail below with reference to the drawings, wherein.

DETAILED DESCRIPTION

The present invention is believed to be applicable to display devices including reflective polarizers. Combinations of reflective and absorbing polarizers are currently used in the LCD market. However, typical currently available absorbing/reflective polarizer combinations utilize high contrast (1000:1 or greater) absorbing polarizers. A high contrast display polarizer including an absorbing polarizer and a reflective polarizer can be made with the use of PVA or iodine absorbing polarizers, as described in Ouderkirk et. al., U.S. Pat. No. 6,096,375, the disclosure of which is hereby incorporated by reference herein. Where a high contrast absorbing polarizer is used, the optical properties of the absorbing polarizer determine the performance of the display device. If a low contrast absorbing polarizer or no absorbing polarizer is used with a reflective polarizer, optical properties of the reflective polarizer become more important for maintaining contrast of the display, especially when the display is intended to be viewed at high angles.

The following description should be read with reference to the drawings, in which like elements in different drawings are numbered in like fashion. The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a film" encompasses embodiments having one, two or more films. As used in this specification and the appended claims, the term "or" is generally employed in its sense including "and/or" unless the content clearly dictates otherwise.

Figure 1:
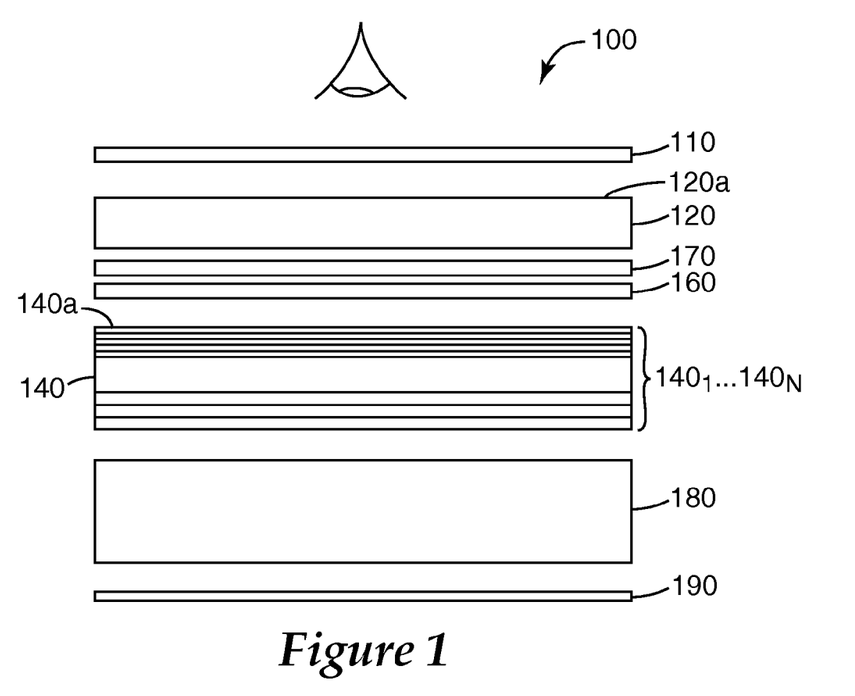
FIG. 1 is a schematic cross-sectional view of a display device according to one exemplary embodiment of the present disclosure.

FIG. 1 shows a display device 100 according to one exemplary embodiment of the present disclosure. The display device 100 includes a display panel 120 and a biaxial reflective polarizer 140 having layers $140_1$-$140_N$. The display panel 120 and the biaxial reflective polarizer 140 each have a viewer side 140a or 120a that faces toward a viewer of the display device 100. In some exemplary embodiments, the display device 100 further includes any number and combination of: an absorbing polarizer 160; a compensation film 170; an additional or second polarizer 110; a backlight 180 for illuminating the display panel 120; and a reflector 190. The absorbing polarizer 160 may be disposed at the viewer side 140a of the biaxial reflective polarizer 140 between the display panel 120 and the biaxial reflective polarizer 140. If present, the transmission axis of the absorbing polarizer 160 should be aligned with the transmission axis of the biaxial reflective polarizer 140 as closely as possible or practicable for a particular application. The degree of alignment will depend on a particular application. For example, the transmission axes may be aligned to within about +/−10 degrees, about +/−5 degrees, about +/−1 degree, about +/−0.5 degree, or even about +/−0.2 degree.

The additional polarizer 110 may be disposed at a side of the display panel 120 that is opposite to the biaxial reflective polarizer 140. The additional polarizer 110 may be any suitable polarizer, such as a reflective or absorbing polarizer or a combined reflective and absorbing polarizer. For many common types of displays the transmission axis of the additional polarizer should be substantially perpendicular to the transmission axis of the biaxial polarizer. In other exemplary displays, the transmission axis of the additional polarizer may be disposed at a different angle with respect to the biaxial polarizer, e.g., 45 degrees. In general, the two display polarizers are oriented such that in combination with a display panel, the dark and bright states of the display are optimized for high contrast.

The compensation film 170 may be disposed between the display panel 120 and the biaxial reflective polarizer 140, between the display panel 120 and the additional polarizer 110, or both. In the embodiments that include an absorbing polarizer 160, the compensation film 170 may be disposed between the absorbing polarizer and the display panel 120. One example of a suitable compensation film is a biaxial birefringent film. One type of a biaxial birefringent film is termed a "D-plate", an example of which is the NRZ™ film available from Nitto Denko Corporation of Osaka, Japan. Such a film has an out of plane retardation $R_{th}$ that is approximately 0, where $R_{th}$ is given by $R_{th}=[(n_x+n_y)/2-n_z]*$thickness. That is, the z-index of the D-plate is approximately equal to the average of the x and y indices of refraction of the film. A typical D-plate compensation film also has an in-plane retardation $R_0=(n_x-n_y)*$thickness that is approximately equal to ½λ, where λ is in the wavelength range of interest.

The compensation film(s) also may be designed to correct for angle-dependent retardation of the LC material. To this end, additional retardance, in an amount equal but opposite in sign to the LC material, is added to the compensation layer(s) to correct for the retardance of the LC material in a complete LC display panel.

In the exemplary embodiments including a backlight 180, the biaxial reflective polarizer 140 may be disposed between the backlight 180 and the display panel 120. The configuration of the backlight 180 is not limited to any specific construction. Any suitable structure capable of providing light to the display panel 120 may be used. Suitable examples of backlights include, without limitation, edge-lit backlights including one or more light sources optically coupled to one or more edges of one or more lightguides, and direct-lit backlights including one or more light sources disposed such that the display panel 120 is disposed between the one or more light sources and a viewer, that is, the one or more light sources are disposed behind the display panel in the field of view of a viewer of the display. In the exemplary embodiments including a reflector 190 and no backlight, the biaxial reflective polarizer 140 may be disposed between the reflector 190 and the display panel 120.

Other optical elements and films may be included into display devices according to the present disclosure as would be known to those of ordinary skill in the art. Exemplary suitable additional optical elements include, without limitation, structured surface films. Examples of structured surface films include films having a plurality of liner prismatic surface structures, a plurality of lenticular surface structures, a matrix or a random array of surface structures, and others. Another type of an optical film suitable for use in displays of the present disclosure are optical films including a layer including beads dispersed in a binder. Similarly, diffuser films used to increase the uniformity of illumination could also be disposed at various locations such as between the backlight and the biaxial reflecting polarizer film. Such films may be disposed between the backlight and the biaxial reflective polarizer or at another suitable location.

Figure 2:
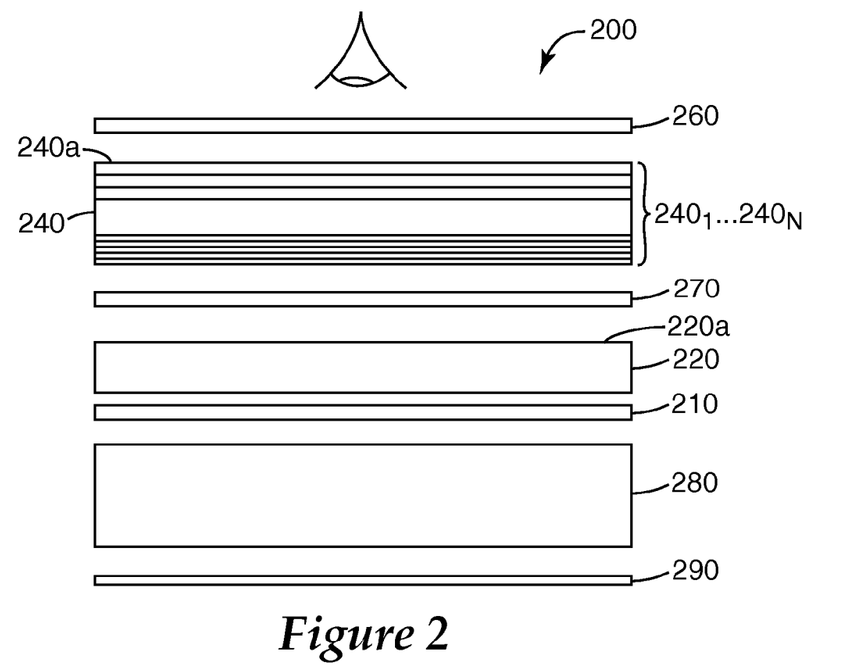
FIG. 2 is a schematic cross-sectional view of a display device according to another exemplary embodiment of the present disclosure.

FIG. 2 shows a display device 200 according to another exemplary embodiment of the present disclosure. The display device 200 includes a display panel 220 and a biaxial reflective polarizer 240 having layers $240_1$-$240_N$. The display panel 220 and the biaxial reflective polarizer 240 each have a viewer side 240a or 220a that faces toward a viewer of the display device 200. In some exemplary embodiments, the display device 200 further includes any number and combination of: an absorbing polarizer 260; a compensation film 270; an additional or second polarizer 210; a backlight 280 for illuminating the display panel 220; and a reflector 290. The absorbing polarizer 260 may be disposed at the viewer side 240a of the biaxial reflective polarizer 240. If present, the transmission axis of the absorbing polarizer 260 should be aligned with the transmission axis of the biaxial reflective polarizer 240. The additional polarizer 210 may be disposed at a side of the display panel 220 that is opposite to the biaxial reflective polarizer 240. The additional polarizer 210 may be any suitable polarizer, such as a reflective or absorbing polarizer or a combined reflective and absorbing polarizer.

The compensation film 270 may be disposed between the display panel and the biaxial reflective polarizer 240, between the display panel 220 and the additional polarizer 210, or both.

In the exemplary embodiments including a backlight 280, the display panel 220 is disposed between the biaxial reflective polarizer 240 and the backlight 280. The configuration of the backlight 280 also is not limited to any specific construction. Any suitable structure capable of providing light to the display panel 220 may be used. In the exemplary embodiments including a reflector 290 and no backlight, the display panel 220 is disposed between the biaxial reflective polarizer 240 and the reflector 290. Other optical elements and films may be included into display devices according to the present disclosure as would be known to those of ordinary skill in the art.

Biaxial Reflective Polarizer

Figure 3:
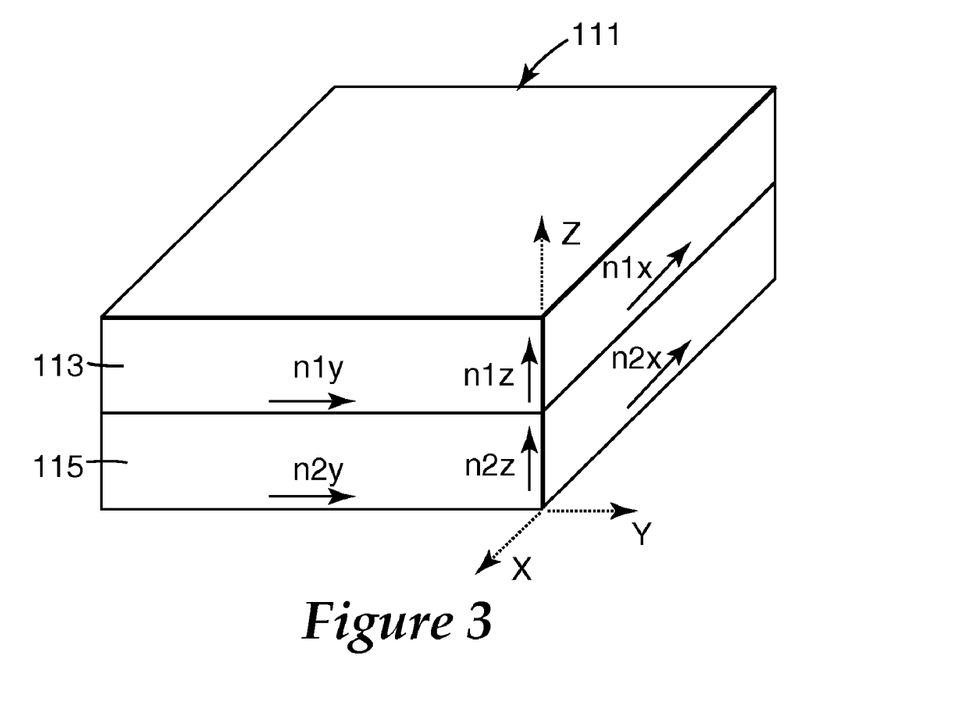
FIG. 3 is a schematic perspective view of a biaxial reflective polarizer according to the present disclosure.

FIG. 3 illustrates an exemplary embodiment of a biaxial reflective polarizer according to the present disclosure, which is a multilayer optical film 111 that includes a first layer of a first material 113 disposed (e.g., by coextrusion) on a second layer of a second material 115. The depicted optical film 111 may be described with reference to three mutually orthogonal axes x, y and z. Two orthogonal axes x and y are in the plane of the film 111 (in-plane, or x and y axes) and a third axis (z-axis) extends in the direction of the film thickness. One or both of the first and second materials may be birefringent.

While only two layers are illustrated in FIG. 3 and generally described herein, typical embodiments of the present disclosure include two or more of the first layers interleaved with two or more of the second layers. The total number of layers may be hundreds or thousands or more. In some exemplary embodiments, adjacent first and second layers may be referred to as an optical repeating unit. Biaxial reflective polarizers suitable for use in exemplary embodiments of the present disclosure are described in, for example, U.S. Pat. Nos. 5,882,774, 6,498,683, 5,808,794, which are incorporated herein by reference.

The optical film 111 may include additional layers. The additional layers may be optical, e.g., performing an additional optical function, or non-optical, e.g., selected for their mechanical or chemical properties. As discussed in U.S. Pat. No. 6,179,948, incorporated herein by reference, these additional layers may be orientable under the process conditions described herein, and may contribute to the overall optical and/or mechanical properties of the film, but for the purposes of clarity and simplicity these layers will not be further discussed in this application. For the purposes of the present disclosure, it is preferred that thick biaxially birefringent outer layers should not be disposed on the side of the biaxial polarizer that faces the display panel. If thick outer layers are needed on the side of the biaxial polarizer that is intended to face the display once installed, such layers should be removable or they should be made of isotropic or only weakly biaxially birefringent materials.

In a reflective polarizer, the refractive indices of the first layers 113 ($n_{1x}$, $n_{1y}$, $n_{1z}$) and those of the second layers 115 ($n_{2x}$, $n_{2y}$, $n_{2z}$) are substantially matched along one in-plane axis (y-axis) and are substantially mismatched along another in-plane axis (x-axis). The matched direction (y) forms a transmission (pass) axis or state of the polarizer, such that light polarized along that direction is preferentially transmitted, and the mismatched direction (x) forms a reflection (block) axis or state of the polarizer, such that light polarized along that direction is preferentially reflected. Generally, the larger the mismatch in refractive indices along the reflection direction and the closer the match in the transmission direction, the better the performance of the polarizer.

To function well for wide angle viewing of a display device, a display polarizer should maintain high block state contrast for all angles of incidence and also maintain high pass transmission over all angles of incidence. For the purposes of the present disclosure, contrast of a polarizer is defined as a photopically averaged pass state transmission value divided by a photopically averaged block state transmission value of the polarizer. As it has been shown in the commonly owned U.S. Pat. No. 5,882,774, pass state transmission increases when the refractive indices of the alternating first and second layers 113 and 115 are matched for light polarized along the z-axis and for light polarized along the y-axis. The z-index matching also ensures that the block state transmission does not degrade at high angles of incidence.

In turn, the present disclosure is directed to biaxial reflective polarizers having one or more biaxially birefringent layers, wherein a particular layer is characterized by $n_y$ that does not equal $n_z$. In typical embodiments of the present disclosure, at least one layer of the biaxial reflective polarizer has an absolute value of refractive index difference for light polarized along a transmission axis of the polarizer (y) and light polarized along a thickness direction of the polarizer (z), $\Delta n_{yz}$, ($\Delta n_{yz}=|n_y-n_z|$ for any layer), also referred to as the y-z refractive index mismatch, that is greater than about 0.005 and, preferably, at least about 0.01. In other exemplary embodiments, $\Delta n_{yz}$ can be at least 0.02, at least 0.08 or another suitable value depending on the application. In some exemplary embodiments, $\Delta n_{yz}$ can be no more than about 0.1. All values of refractive indices and refractive index differences are reported for 633 nm.

Figure 4:
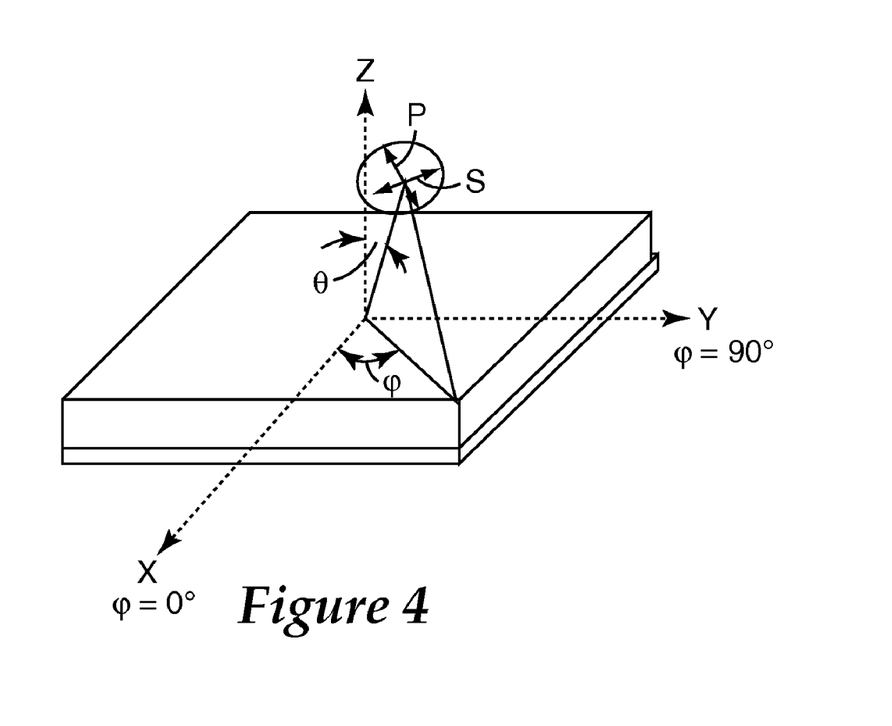
FIG. 4 is a schematic representation of light incident on a biaxial reflective polarizer at non-zero polar angles ($\theta$) and at azimuth angles ($\phi$) between 0 and 90 degrees.

Although such biaxial reflective polarizers typically have low reflectivity for light polarized parallel to the pass axis (y) for any angle of incidence, when light is incident onto the reflective polarizer at non-zero polar angles (θ) and at azimuth angles (φ) between 0 and 90 degrees (see FIG. 4), the magnitude of the reflectivity can oscillate dramatically as a function of both angle of incidence and wavelength of the incident light. This is believed to be due to unequal conversion of s-polarization to p-polarization and p-polarization to s-polarization as a function of wavelength as light traverses the biaxial medium. This phenomenon both increases appearance of undesirable color of the display device and lowers the contrast of the reflective polarizer when it is crossed with another reflective polarizer or with an absorbing polarizer. When a polarizer is used in a display and crossed with another polarizer, a uniform extinction vs. wavelength spectrum is desired for all azimuths (φ) from 0 to 360 degrees, i.e., not just for the planes of incidence parallel to the block and pass axes but for all azimuthal angles (φ) between the optic axes.

The present disclosure provides a construction for a display device including a biaxial reflective polarizer that yields improved pass state transmission and improved contrast for all azimuthal angles at non-zero polar angles of incidence. This construction includes, for example, a biaxial reflective polarizer constructed of alternating low and high index layers, e.g., first and second layers 113 and 115, with the optical thickness of the repeat unit $d_1*n_{x1}+d_2*n_{x2}$ at normal incidence being of ½λ thickness and wherein the repeat units, as well as the constituent layers, are arranged such that a majority of the layers having a smaller optical thickness d*n (referred to as "blue" layers) are disposed closer to the display panel than the layers having a larger optical thickness (referred to as "red" layers). When such a polarizing film is crossed with itself or with an absorbing polarizer, the extinction is much better at more angles around the azimuth, if the blue layers are closest to the other polarizer.

Preferably, the profile of the optical thickness of the layers through the thickness of the biaxial reflective polarizer is a monotonic function. However, in some exemplary embodiments, the function characterizing the profile of optical thicknesses of the layers in a biaxial reflective polarizer may have local minima and maxima, which can be disregarded, so long as the majority of the layers having a smaller optical thickness are disposed closer to the display panel than the layers having a larger optical thickness. This is a cumulative effect, the more thick layers that are interposed between the thin layers and the opposing polarizer, the worse the consequences.

Figure 9:
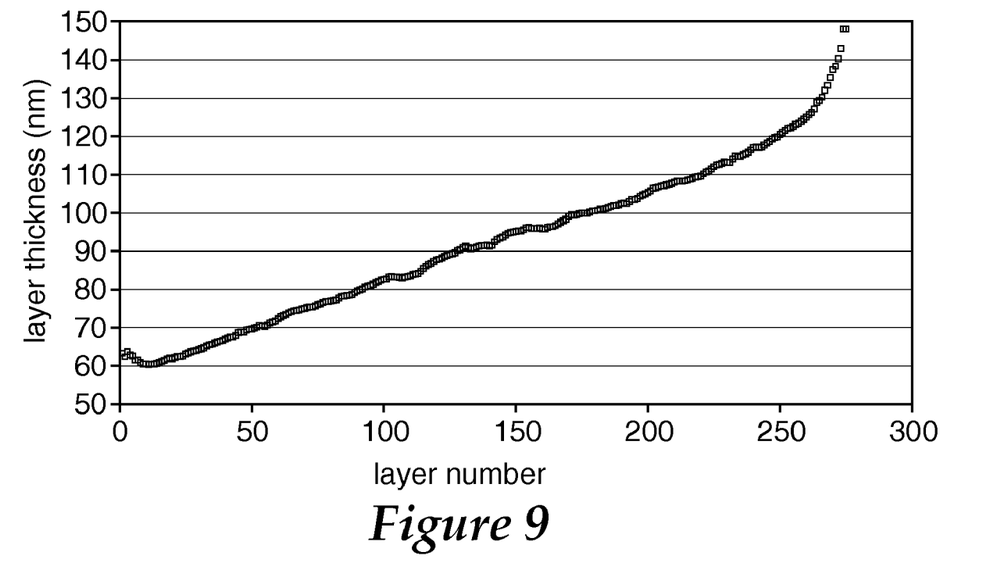
FIG. 9 shows the layer optical thickness profile of the biaxial reflective polarizer used to generate FIG. 8.
Figure 11:
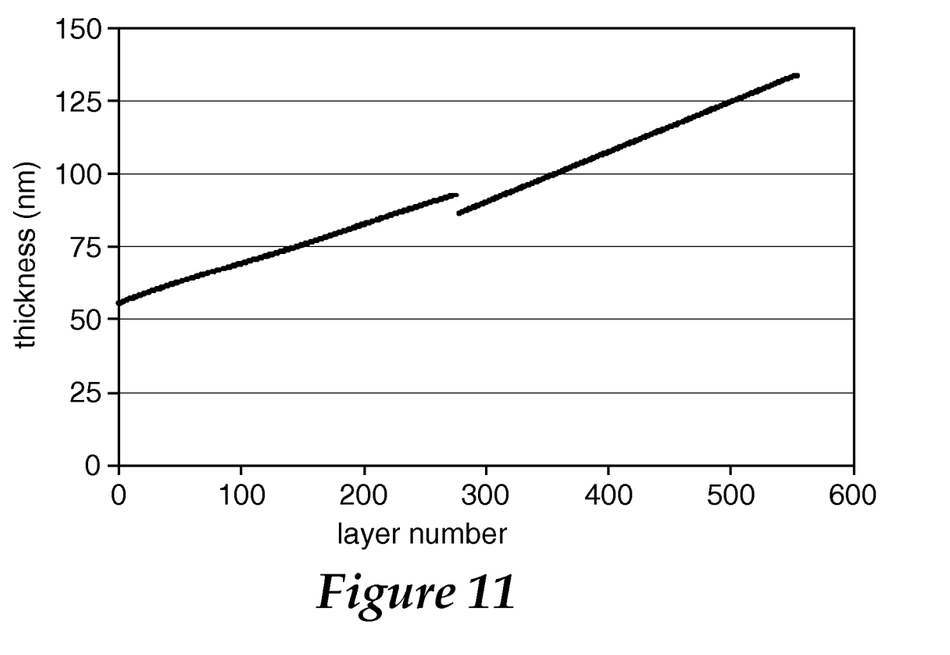
FIG. 11 shows yet another exemplary layer optical thickness profile of a biaxial reflective polarizer.

Examples of biaxial reflective polarizers having layers characterized by varying optical thicknesses of the layers are shown in FIGS. 9 and 11. In these exemplary biaxial reflective polarizers, a majority of the layers of the biaxial reflective polarizer are disposed such that their optical thicknesses decrease monotonically in the direction toward the layer labeled as 0. In the embodiment of FIG. 11 there is a disruption in the polarizer mid-section, which does not interfere with the purposes of the present disclosure, so long as the majority of layers follow a substantially monotonical distribution. If these exemplary biaxial reflective polarizers are assembled into display devices, the layer labeled as 0 should face the display panel. In other words, a majority of the layers of the biaxial reflective polarizer should be disposed such that their optical thicknesses decrease monotonically in the direction toward the display panel.

Figure 10:
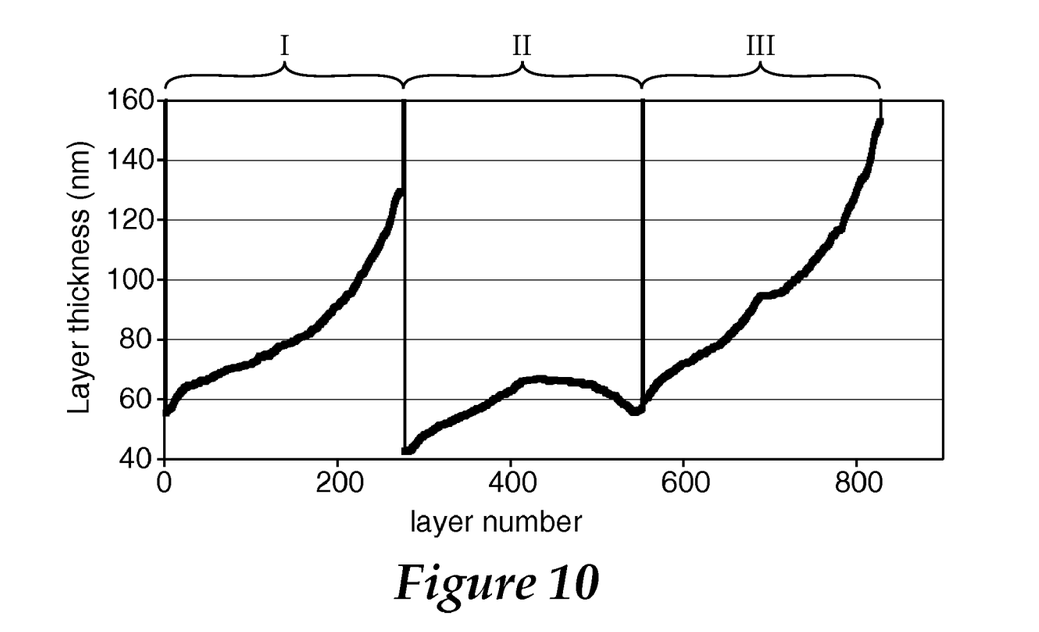
FIG. 10 shows another exemplary layer optical thickness profile of a biaxial reflective polarizer.

FIG. 10 shows schematically another exemplary biaxial reflective polarizer having layers characterized by varying optical thicknesses. In FIG. 10, optical thicknesses of the layers decrease substantially monotonically in regions I and III and have a local maximum in region II. In this exemplary biaxial polarizer, a majority of the layers of the biaxial reflective polarizer having a smaller optical thickness are disposed closer to the layer labeled as 0 than the layers having a larger optical thickness. If the exemplary biaxial reflective polarizer illustrated in FIG. 10 is assembled into a display device, the layer labeled as 0 should face the display panel. In other words, the layers of the biaxial reflective polarizer should be disposed such a majority of the layers of the biaxial reflective polarizer having a smaller optical thickness are closer to the display panel than the layers having a larger optical thickness.

Figure 5:
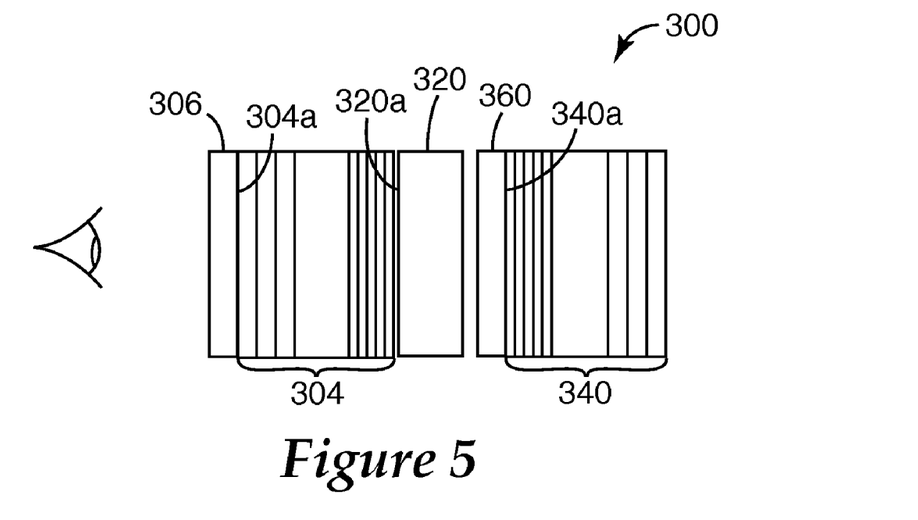
FIG. 5 is a schematic cross-sectional view of a display device according to yet another exemplary embodiment of the present disclosure.

This construction is illustrated in FIGS. 1, 2 and 5. FIGS. 1 and 2 illustrate biaxial reflective polarizers 140 and 240, each having a plurality of layers $140_{1-N}$ and $240_{1-N}$ characterized by a varying optical thickness, disposed such that a majority of the layers of the biaxial reflective polarizer 140 or 240 having a smaller optical thickness are disposed closer to the display panel 120 or 220 than the layers having a larger optical thickness. In some exemplary embodiments, optical thicknesses of the majority of the layers $140_{1-N}$ and $240_{1-N}$ decrease monotonically in the direction toward the display panel 120 or 240.

FIG. 5 shows another exemplary display 300 according to the present disclosure, including a display panel 320 having a viewer side 320a and a first biaxial reflective polarizer 304 having a viewer side 304a disposed such that the viewer side 320a of the display panel 320 faces the first biaxial reflective polarizer 304. In this exemplary embodiment, a first anti-reflection (AR) layer 306, which may be an absorbing polarizer, is disposed such that the viewer side 304a of the first biaxial reflective polarizer faces the AR layer 306. The first biaxial reflective polarizer 304 has a plurality of layers characterized by a varying optical thickness and is disposed such that a majority of the layers having a smaller optical thickness are disposed closer to the display panel 320 than the layers having a larger optical thickness.

The display 300 further includes a second biaxial reflective polarizer 340 having a viewer side 340a. A second AR layer 360, which may be an absorbing polarizer, is disposed such that the viewer side 340a of the second biaxial reflective polarizer faces the second AR layer 360. The second biaxial reflective polarizer 340 also has a plurality of layers characterized by a varying optical thickness and is disposed such that a majority of the layers having a smaller optical thickness are disposed closer to the display panel 320 than the layers having a larger optical thickness. In some exemplary embodiments, optical thicknesses of the majority of the layers of the biaxial polarizer 304, 340, or both, decrease monotonically in the direction toward the display panel 320.

Absorbing Polarizer

In typical embodiments of the present disclosure having absorbing and biaxial reflective polarizers, an absorbing polarizer is disposed at the viewer side of the biaxial reflective polarizer. An absorbing polarizer can be stacked with a biaxial reflective polarizer, laminated to a biaxial reflective polarizer, co-extruded with the biaxial reflective polarizer or coated onto and oriented with a biaxial reflective polarizer. In one preferred embodiment, the absorbing polarizer is coextruded and oriented with the reflecting polarizer. In such a case it may be preferable to place a polarizing dye in, e.g., an oriented semicrystalline skin layer of the reflective polarizer. In this case, the layer with the absorbing dye is preferably uniaxial, or at most weakly biaxial. Generally, thick stongly biaxially birefringent layers should be avoided on the viewer side of the multilayer reflective polarizer. Absorbing polarizers used in exemplary embodiments of the present disclosure have a contrast ratio of less than 1000:1, thus making the contribution of the biaxial reflective polarizer more important. In some exemplary embodiments, the contrast ratios of absorbing polarizers may be about 500:1 or less, about 100:1 or less, about 10:1 or less, or about 5:1 or less. In some exemplary embodiments, the absorbing polarizer may be characterized by a contrast ratio of about 5:1 to about 100:1.

Where the absorbing polarizer of the absorbing/reflective polarizer pair has a contrast ratio of up to about 10:1, the reflective polarizer preferably has a contrast of at least about 1000:1. In other exemplary embodiments, the biaxial reflective polarizer may be characterized by a contrast ratio of at least about 50:1, at least about 100:1 or at least about 500:1. The absorbing/reflective polarizer pair according to the present disclosure may have a total contrast ratio of about 500:1 or more or about 1000:1 or more. In some exemplary embodiments, the contrast ratio of the absorbing/reflective polarizer pair according to the present disclosure may be as high as about 10,000:1.

EXAMPLES

The arrangement of optical repeating units in a thin-to-thick design described in detail above enables an improved compensation of the Maltese cross effect for a biaxial reflective polarizer. This in turn provides for higher contrast of a display device, when a biaxial reflective polarizer is utilized as the display polarizer, alone or in combination with an absorbing polarizer. Examples provided below illustrate advantages of exemplary embodiments of the present disclosure.

Example 1

PVA-Iodine Polarizers

Figure 6:
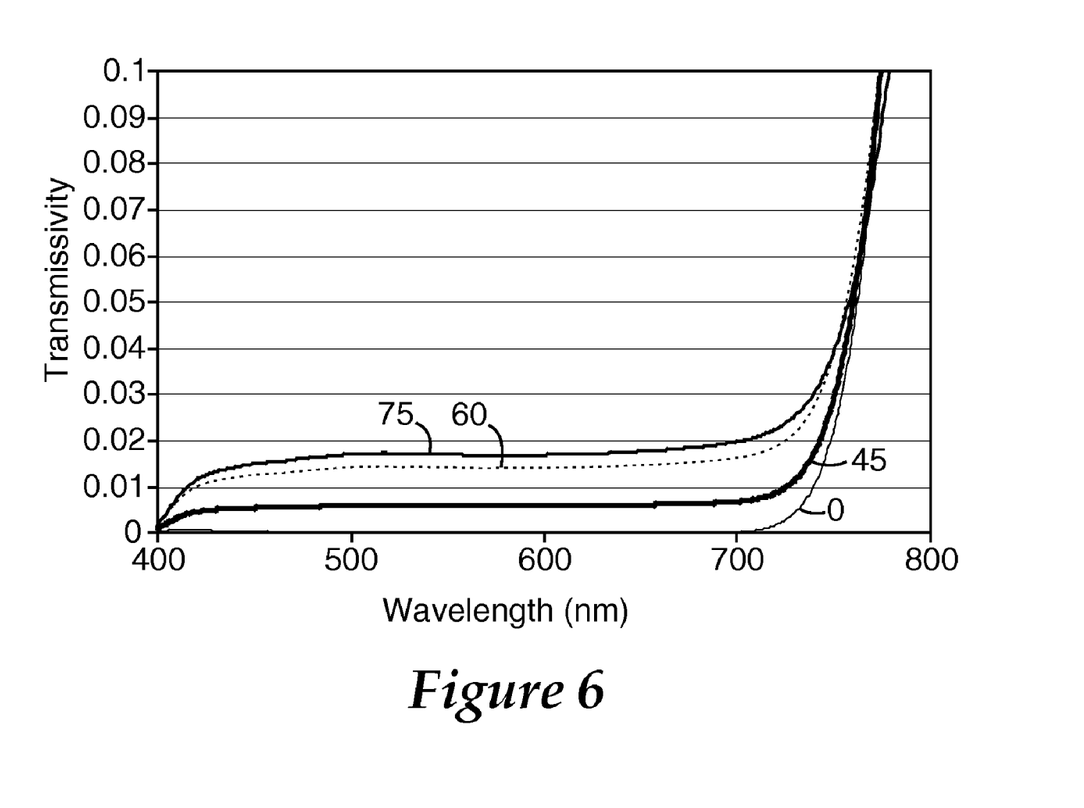
FIG. 6 is a plot of transmission values vs. wavelength and polar angle of incidence ($\theta$) for two crossed absorbing polarizers, with light incident at a 45 degrees azimuth angle ($\phi$)

As a baseline comparative example, the transmission of two crossed absorbing polarizers was calculated for a range of polar incidence angles for a plane of incidence at 45 degrees azimuth with respect to the in-plane optic axes. The model was based on the measured properties of a LL-5518 iodine-type absorbing polarizer (available from Sanritz Corporation of Tokyo, Japan) with no triacetate cellulose (TAC) layers. The transmission values are shown in FIG. 6 as a function of wavelength and polar angle of incidence. At 60 degrees angle of incidence the leak of light through the crossed polarizers is about 1.5%, which is the typical measured value for crossed absorbing polarizers.

Figure 7:
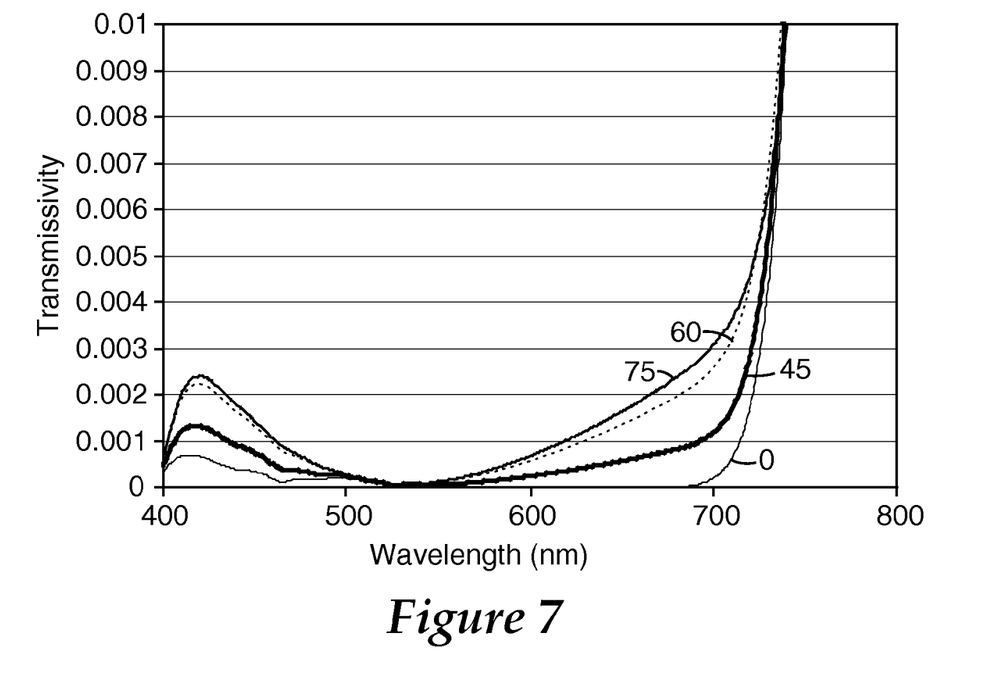
FIG. 7 is a plot of transmission values vs. wavelength and polar angle of incidence ($\theta$) for two crossed absorbing polarizers and a D-plate disposed therebetween, with light incident at a 45 degrees azimuth angle ($\phi$)

If a D-plate retarder, such as previously defined, is inserted between the crossed polarizers, the transmission value at each angle is decreased substantially, as illustrated by the modeled results in FIG. 7. Notably, the scale has changed about 10 times. At about 530 nm, the half-wave value of the D-plate, the transmission is negligible. The D-plate used in this and other modeled examples was assumed to have an in-plane retardance of 265 nm (a half-wave at 530 nm) and was assumed to be made of a material with the nominal refractive indices and dispersion values of polycarbonate. The thickness of the D-plate was assumed to be 10 microns, the in-plane indices were assumed to be $n_x=1.5917$ and $n_y=1.5655$ at 633 nm, and the refractive index in the thickness direction was assumed to have a value of $n_z=1.5786$.

Example 2

Reflective/Absorbing Polarizer Crossed with an Absorbing Polarizer

In this example, one of the absorbing polarizers of Example 1 is replaced with a reflecting/absorbing polarizer combination and the D-plate removed. The absorbing polarizer portion of the combination has a low contrast, with about 20% block state transmission. This absorbing polarizer (here, operating as an antireflection (AR) layer and substantially aligned with the reflecting polarizer) is placed adjacent the other absorbing polarizer. The layers of the reflective polarizer are assumed to be slightly biaxial. The high refractive index layers have a y-z refractive index mismatch of about 0.015 ($n_x=1.820$, $n_y=1.575$, $n_z=1.560$). The lower refractive index layers were isotropic. To simulate the effects of a dyed absorbing polarizing layer that is coextruded and stretched with the reflective polarizer the AR layer is assumed to have the same real refractive indices as the high index layers of the reflective polarizer but have the imaginary (absorbing) indices of the absorbing polarizers and a thickness adjusted so the block transmission of the absorbing layer was 20%. The assumed thickness of the AR layer was therefore 15 microns. The transmission spectra for various incidence angles at the 45 degree azimuth are presented in FIG. 8.

Figure 8:
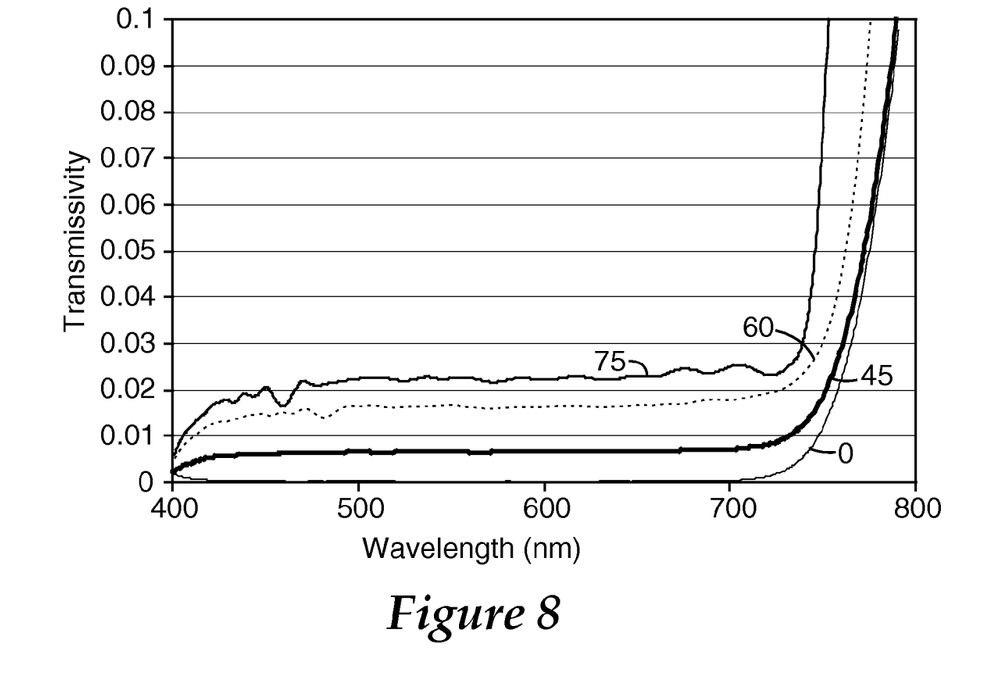
FIG. 8 is a plot of transmission values vs. wavelength and polar angle of incidence ($\theta$) for crossed absorbing and relatively weakly biaxial reflective polarizers, with light incident at a 45 degrees azimuth angle ($\phi$) and the "blue" layers of the reflective polarizer disposed in toward the absorbing polarizer.

The spectra of FIG. 8 are similar in appearance and magnitude to those of FIG. 6 for the absorbing polarizer pair. The layer thickness profile of the reflective portion of the absorbing/reflective polarizer combination is illustrated in FIG. 9. A majority of thinner layers were nearest the absorbing polarizer.

Figure 12:
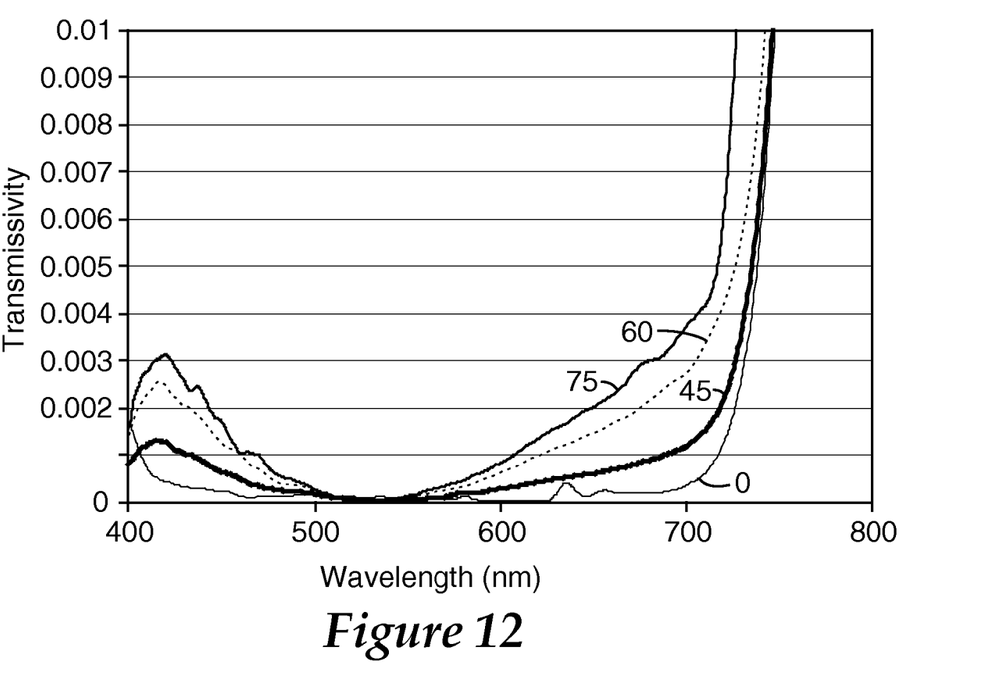
FIG. 12 is a plot of transmission values vs. wavelength and polar angle of incidence ($\theta$) for the configuration used to generate FIG. 8, with a D-plate disposed between the crossed polarizers.

When the D-plate, described above, is inserted between the polarizer combination and the crossed absorbing polarizer, the transmission values at the 45 azimuth plane of incidence drop dramatically, similar to the absorbing polarizers in Example 1. The spectra of the present example with the D-plate are shown in FIG. 12.

Example 3

Reversed Layer Thickness Profile of Example 2

Figure 13:
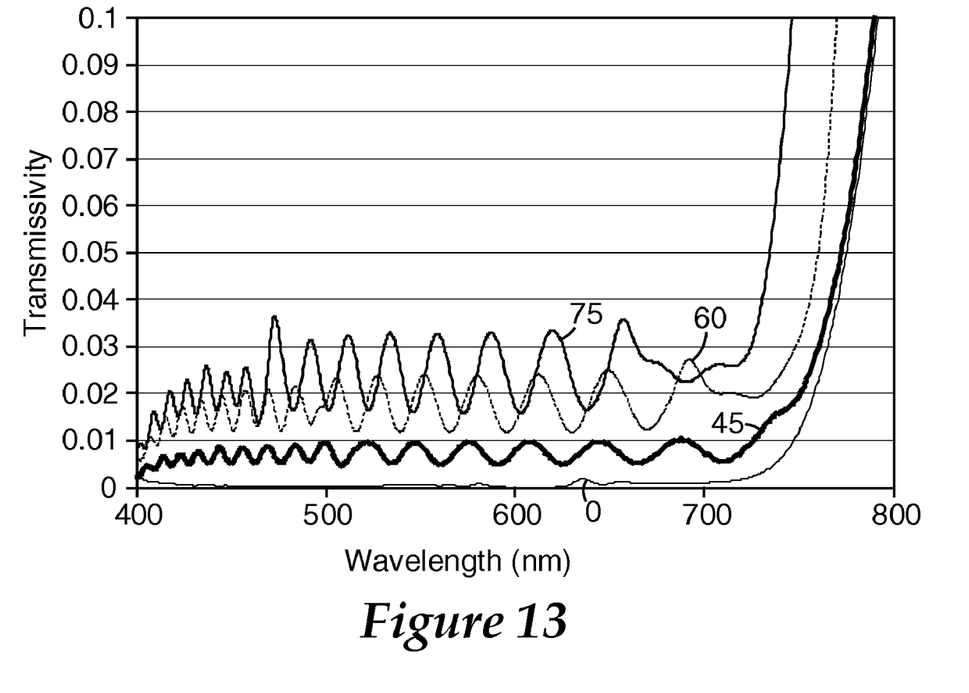
FIG. 13 is a plot of transmission values vs. wavelength and polar angle of incidence ($\theta$) for crossed absorbing and biaxial reflective polarizers used to generate FIG. 8, with the optical thickness profile of the layers reversed, such that the "red" layers of the reflective polarizer disposed in toward the absorbing polarizer.

If the layer optical thickness profile of Example 2 is reversed, i.e., a majority of thicker optical layers of the reflective polarizer are adjacent the crossed absorbing polarizer, then the transmission spectra change from those of FIG. 8 to those of FIG. 13. The absorbing polarizer (AR) layer remains adjacent the high contrast absorbing polarizer and, in this case, closer to the majority of the thicker optical layers. Although the average transmission is about the same as in FIG. 8, the oscillatory behavior of the spectra shown in FIG. 13 can give rise to increased color in a display device, which uses a light source exhibiting narrow emission bands.

Figure 14:
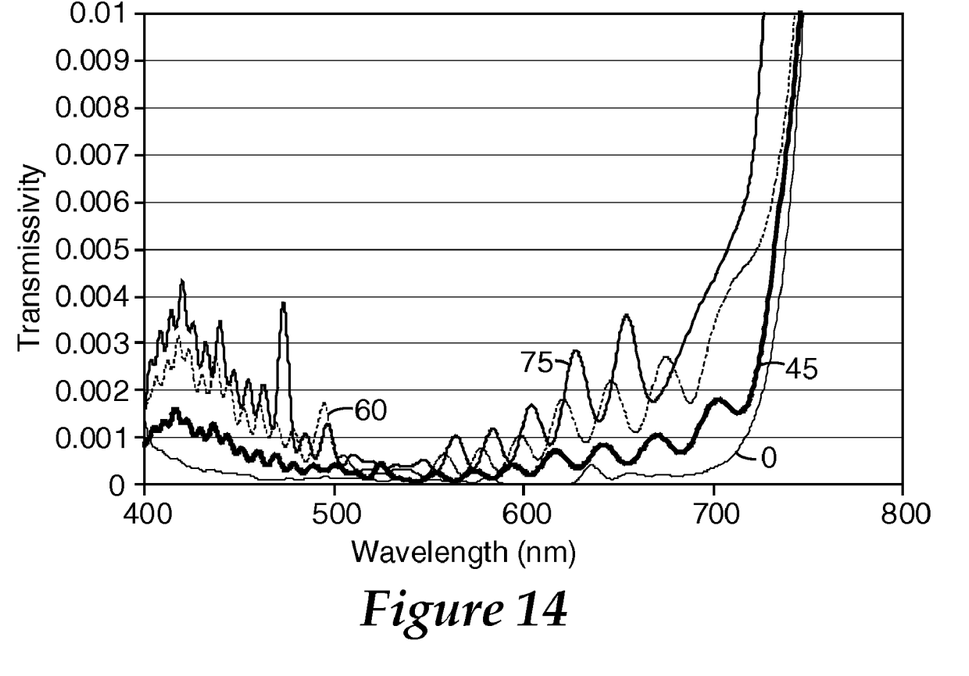
FIG. 14 is a plot of transmission values vs. wavelength and polar angle of incidence (θ) for the configuration used to generate FIG. 13, with a D-plate disposed between the crossed polarizers.

The use of a D-plate with this set of crossed polarizers greatly reduces the transmission for all incidence angles, but some ripple effects remain in the spectra, which can give rise to color, as it is illustrated in FIG. 14. In displays that use practical compensation films, the oscillations will not be damped as well as in this modeled example. Thus, it is preferable to place a majority of the thinner optical layers closest to the opposing display polarizer, which would be disposed on the other side of the display panel.

Example 4

Reflective Polarizer with Highly Biaxial Layers

Figure 15:
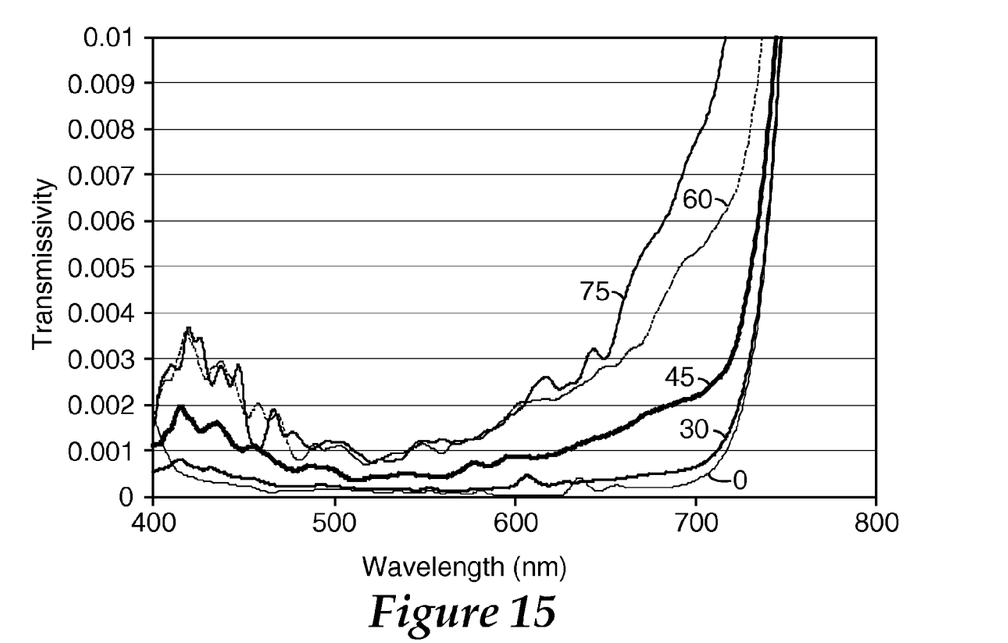
FIG. 15 is a plot of transmission values vs. wavelength and polar angle of incidence (θ) for crossed absorbing and relatively strongly biaxial reflective polarizers with a D-plate disposed therebetween, with light incident at a 45 degrees azimuth angle (φ), the "blue" layers of the reflective polarizer disposed in toward the absorbing polarizer.
Figure 16:
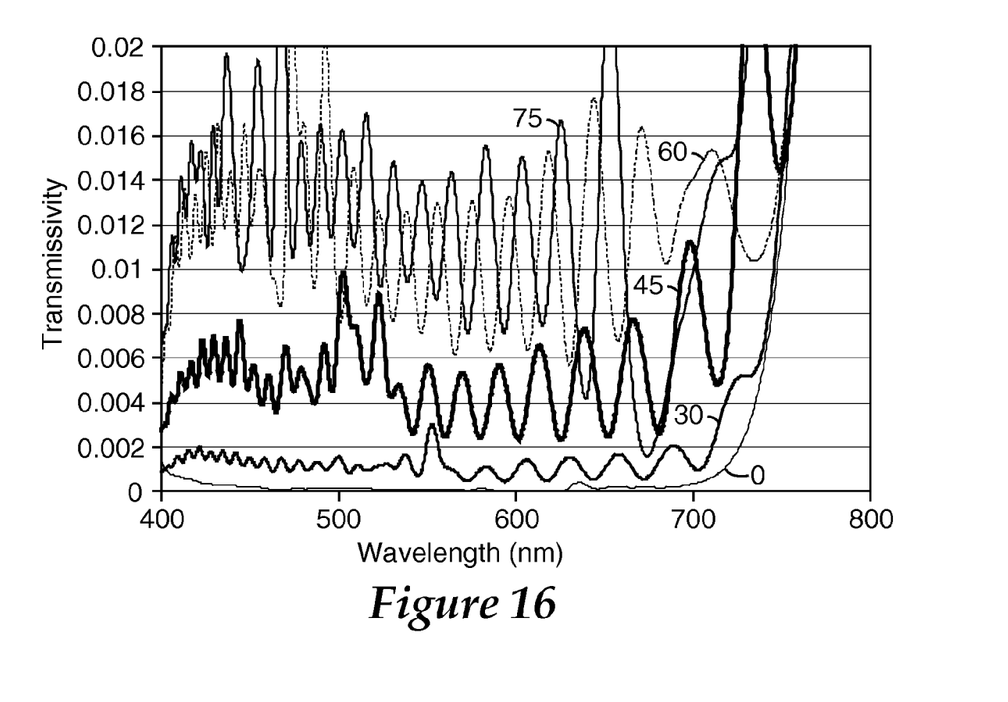
FIG. 16 is a plot of transmission values vs. wavelength and polar angle of incidence (θ) for the configuration used to generate FIG. 15, with the optical thickness profile of the layers reversed, such that the "red" layers of the reflective polarizer disposed in toward the absorbing polarizer.

For this example, the calculations of Examples 2 and 3 were repeated for a reflective polarizer having high refractive index layer indices changed from ($n_x$=1.820, $n_y$=1.575, $n_z$=1.560) to ($n_x$=1.820, $n_y$=1.575, $n_z$=1.500). For ease of comparison, only the z-index has been changed. $\Delta n_{yz}$ is now 0.075 instead of 0.015, which amounts to an increase of 5 times. For a reflective polarizer with this y-z refractive index difference, the arrangement of thin layers toward the opposing display polarizer (which would be on the other side of the display panel) with a D-plate still results in lower transmission, as seen in FIG. 15. In contrast, the same arrangement with the thick layers inward results in substantial transmission and high ripple effects in the spectra, as shown in FIG. 16. Also notable is the 2× increase in scale.

From these examples, it is clear that as the constituent layers of a multilayer reflective polarizer deviate from a purely uniaxial character, it is preferable that they be arranged in a thin to thick profile, in terms of optical thickness, with the thinnest layers adjacent the opposing crossed polarizer.

Although the devices of the present disclosure have been described with reference to specific exemplary embodiments, those of ordinary skill in the art will readily appreciate that changes and modifications may be made thereto without departing from the spirit and scope of the present disclosure. In particular, although a specific display element has not been specified in any of the preceding examples it should be appreciated that such examples approximately describe devices using a liquid crystal display based on in-plane switching (IPS). As mentioned previously, other types of displays can be employed which may be compensated with additional or alternative elements other than the D-plate yet still require the specified disposition of the thin and thick layers of the biaxial reflective polarizer.

What is claimed is:

1. A display device comprising:
   a display panel; and
   a biaxial reflective polarizer having a plurality of layers characterized by a varying optical thickness;
   wherein a majority of the layers of the biaxial reflective polarizer are disposed such that their optical thicknesses decrease monotonically in the direction toward the display panel.

2. The display device of claim 1, wherein at least one layer of the biaxial reflective polarizer has a refractive index difference for light polarized along a transmission axis of the polarizer and for light polarized along a thickness direction of the polarizer of at least about 0.01 at 633 nm.

3. The display device of claim 1, wherein at least one layer of the biaxial reflective polarizer has a refractive index difference for light polarized along a transmission axis of the polarizer and for light polarized along a thickness direction of the polarizer is no more than about 0.1 at 633 nm.

4. The display device of claim 1, further comprising a second polarizer disposed on a side of the display panel opposite to the biaxial reflective polarizer.

5. The display device of claim 4, wherein the second polarizer comprises an absorbing polarizer.

6. The display device of claim 4, wherein the second polarizer comprises a biaxial reflective polarizer having a plurality of layers characterized by a varying optical thickness, wherein a majority of the layers having a smaller optical thickness are disposed closer to the display panel than the layers having a larger optical thickness.

7. The display device of claim 1, further comprising an absorbing polarizer disposed next to a viewer side of the biaxial reflective polarizer.

8. A display device comprising:
   a display panel;
   a biaxial reflective polarizer having a plurality of layers characterized by a varying optical thickness; and
   an absorbing polarizer disposed next to a viewer side of the biaxial reflective polarizer, the absorbing polarizer having a contrast ratio of about 500:1 or less;
   wherein a majority of the layers of the biaxial reflective polarizer having a smaller optical thickness are disposed closer to the display panel than the layers having a larger optical thickness.

9. The display device of claim 8, wherein a majority of the layers of the biaxial reflective polarizer are disposed such that their optical thicknesses decrease monotonically in the direction toward the display panel.

10. The display of claim 8, wherein the absorbing polarizer is characterized by a contrast ratio of about 5:1 to about 100:1.

11. The display of claim 8, wherein the biaxial reflective polarizer is characterized by a contrast ratio of at least about 50:1.

12. The display of claim 8, wherein the biaxial reflective polarizer is characterized by a contrast ratio of at least about 500:1.

13. The display device of claim 8, further comprising a second polarizer disposed on a side of the display panel opposite to the biaxial reflective polarizer.

14. A display device comprising:
   a display panel;
   a biaxial reflective polarizer having a plurality of layers characterized by a varying optical thickness; and
   an absorbing polarizer disposed next to a viewer side of the biaxial reflective polarizer, the absorbing polarizer having a contrast ratio of less than 1000:1;
   wherein a majority of the layers of the biaxial reflective polarizer are disposed such that their optical thicknesses decrease monotonically in the direction toward the display panel.

15. The display device of claim 14, further comprising a compensation layer disposed between the absorbing polarizer and the display panel.

16. The display device of claim 15, further comprising a second polarizer disposed on a side of the display panel opposite to the biaxial reflective polarizer.

17. The display device of claim 16, further comprising a second compensation layer disposed between the second polarizer and the display panel.

18. The display of claim 14, wherein the absorbing polarizer is characterized by a contrast ratio of about 500:1 or less.

19. The display of claim 14, wherein the absorbing polarizer is characterized by a contrast ratio of about 100:1 or less.

20. The display of claim 19, wherein the biaxial reflective polarizer is characterized by a contrast ratio of at least about 500:1.

* * * * *